(12) United States Patent
Shin

(10) Patent No.: US 12,489,878 B1
(45) Date of Patent: Dec. 2, 2025

(54) MULTI-DEVICE IMAGE CAPTURE FOR IMAGE EFFECTS

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/988,221

(22) Filed: Dec. 19, 2024

(51) Int. Cl.
*H04N 13/344* (2018.01)
*G02B 27/01* (2006.01)
*H04N 13/111* (2018.01)

(52) U.S. Cl.
CPC ....... *H04N 13/344* (2018.05); *G02B 27/0172* (2013.01); *H04N 13/111* (2018.05); *G02B 2027/0138* (2013.01); *G02B 2027/014* (2013.01); *G02B 2207/101* (2013.01)

(58) Field of Classification Search
CPC ................ H04N 13/344; H04N 13/111; G02B 27/0172; G02B 2027/0138; G02B 2027/014; G02B 2207/101
USPC ........................................................ 348/51
See application file for complete search history.

(56) References Cited

U.S. PATENT DOCUMENTS

| 2021/0375029 | A1 | 12/2021 | Mitchell et al. | |
| 2022/0207840 | A1 | 6/2022 | Cansizoglu et al. | |
| 2023/0370728 | A1 | 11/2023 | Molholm | |
| 2024/0104860 | A1* | 3/2024 | McKenzie | G02B 27/0172 |
| 2024/0406368 | A1* | 12/2024 | Lemay | H04N 13/296 |

OTHER PUBLICATIONS

Wang, et al., "A Practical Stereo Depth System for Smart Glasses", 2023 IEEE/CVF Conference on Computer Vision and Pattern Recognition (CVPR), https://doi.org/10.1109/CVPR52729.2023.02059, pp. 21498-21507.

* cited by examiner

*Primary Examiner* — Marnie A Matt
(74) *Attorney, Agent, or Firm* — Brake Hughes Bellermann LLP

(57) ABSTRACT

Described techniques capture a first image of a scene using a first device and cause a second device to capture a second image of the scene. A distance between the first device and the second device may be determined, and a spatial image of the scene may be generated using the first image, the second image, and the distance.

20 Claims, 9 Drawing Sheets ns. When executed, the instructions cause the at least one processor to capture a first image of a scene using the at least one camera and cause a second device to capture a second image of the scene. When executed, the instructions cause the at least one processor to determine a distance between the wearable device and the second device, and generate a spatial image of the scene using the first image, the second image, and the distance.

The details of one or more implementations are set forth in the accompanying drawings and the description below. Other features will be apparent from the description and drawings, and from the claims.

DETAILED DESCRIPTION

Figure 1:
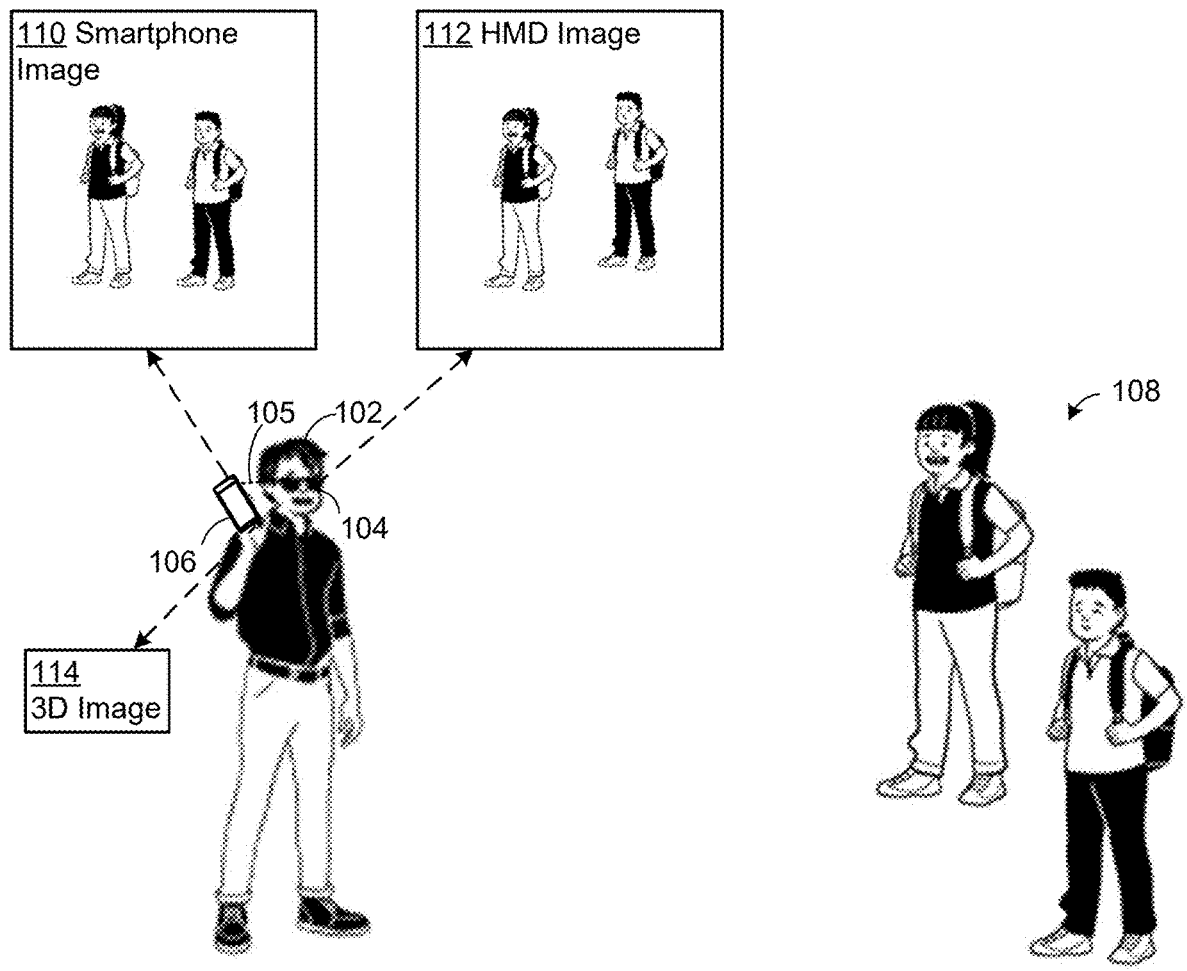
FIG. 1 illustrates an example implementation of a system for multi-device image capture for image effects.

Described systems and techniques enable multi-device image capture for image effects. For example, the systems and techniques described herein enable use of a first device having a first camera to invoke use of a second device, at a variable distance from the first device, having a second camera. The first and second cameras may thus be used to capture at least a pair of images of a scene from their respective viewpoints, while the variable distance therebetween may be determined by one of the devices in conjunction with the capture of the corresponding images.

At least one technical problem solved by the described techniques includes generating stereoscopic images and videos. At least one technical problem solved by the described techniques includes generating stereoscopic images, stereoscopic videos, and volumetric captures using at least two devices, when an inter-device distance between the two devices is variable. At least one technical problem solved by the described techniques includes generating stereoscopic images and videos using two cameras when at least one of the cameras used is nonstationary relative to the other camera(s) being used and a distance between the two cameras is relatively large.

At least one technical solution to the above and other technical problems includes use of a first device capturing an image of a scene to invoke image capture of the scene by a second device. Then, an initial (e.g., estimated) inter-device distance may be used to generate an initial stereoscopic image having an initial stereoscopic image quality. The initial inter-device distance may be updated over a number of iterations, in response to iterative changes in the associated stereoscopic image quality of iterated stereoscopic images, until an actual inter-device distance and associated stereoscopic image are determined.

MULTI-DEVICE IMAGE CAPTURE FOR IMAGE EFFECTS

BACKGROUND

Conventional techniques for capturing 3D images include the use of multiple image sensors or cameras on a single device. For example, a smartphone may have a cluster of cameras, or a head-mounted device (HMD) may have a camera positioned at each temple. In the example of the smartphone, cameras in the cluster may be positioned very close to one another, which may reduce a desired 3D effect because of the relatively small difference between the viewing angles of the cameras. In the example of the HMD, there may be relatively more distance between the two or more cameras. Nonetheless, the distance may not be sufficient for certain desired effects, and the distance is fixed because the positions of the cameras are fixed.

SUMMARY

As described herein, a computing device may be configured to generate 3D image effects in conjunction with a second computing device. Specifically, as described herein, a computing device such as an XR device may be configured to communicate with a second device (e.g., a smartphone or other wearable device) to capture images of a scene from two different perspectives, where the distance between the XR device and the second device may be relatively large and variable. Thus, XR devices may be provided with an ability to capture stereoscopic images or video, even when a distance between the two devices being used is initially unknown and/or dynamically changing. Moreover, the captured images or video may be very high-quality with respect to providing desired 3D effects, because, e.g., the distance between the two devices may be larger than is possible using conventional techniques. Although at least some of the description is related to an XR device, the concepts described herein can be applied to any type of computing device(s), such as a mobile phone, laptop computing device, smart device, and/or so forth.

In a general aspect, a method includes capturing a first image of a scene using a first device and causing a second device to capture a second image of the scene. The method includes determining a distance between the first device and the second device, and generating a spatial image of the scene using the first image, the second image, and the distance.

In another general aspect, a computer program product is tangibly embodied on a non-transitory computer-readable storage medium and comprises instructions. When executed by at least one computing device (e.g., by at least one processor of the at least one computing device), the instructions are configured to cause the at least one computing device to capture a first image of a scene using a first device and cause a second device to capture a second image of the scene. When executed by at least one computing device (e.g., by at least one processor of the at least one computing device), the instructions are configured to cause the at least one computing device to determine a distance between the first device and the second device may be determined, and generate a spatial image of the scene using the first image, the second image, and the distance.

In another general aspect, a wearable device includes at least one frame for positioning the wearable device on a body of a user, at least one camera, at least one display, at least one processor, and at least one memory storing instruc- At least one technical solution to the above and other technical problems includes continuously or repeatedly determining a variable inter-device distance between two devices used to capture images of a scene, to thereby continuously or repeatedly determine corresponding stereoscopic images. Such techniques provide technical solutions for capturing stereoscopic images using a relatively large distance between utilized cameras, which provides high quality, high resolution, and high information stereoscopic images. Such techniques further provide technical solutions for capturing high-quality stereoscopic video in an inexpensive and available manner, e.g., using wearable and/or holdable devices.

For example, a HMD may be worn by a user and may have a first camera, while a smartphone may be held by the user and may have a second camera. Upon initiation of an image capture of a scene by the HMD using the first camera, the HMD may invoke the smartphone to execute an image capture of the scene using the second camera. The HMD may then use a resulting pair of images from the first camera and the second camera to output a stereoscopic image of the scene.

Specifically, as referenced above and described in more detail, below, the HMD may use an initial distance estimate of an inter-device distance to determine an initial stereoscopic image and associated initial stereoscopic image quality. Then, the HMD may iteratively adjust the inter-device distance used with the captured images to obtain updated stereoscopic images, the quality of which may then be evaluated. Over a number of iterations in which the quality of the stereoscopic images is progressively improved, the HMD may determine an actual inter-device distance associated with the highest-available stereoscopic image quality.

By collecting a plurality of frames using such techniques, a stereoscopic video may be produced. The stereoscopic video may be produced even when the inter-device distance varies between the various frames of the video, as the inter-device distance may be calculated in conjunction with each pair of images captured.

In some examples, various types of cameras may be used, including wearable, holdable, and/or fixed cameras. For example, any type of wearable or holdable camera may be used to initiate image capture, while a second camera may include a wall-mounted or otherwise fixed camera. In other examples, three or more devices may be used. In other examples, two or more users, each with at least one device, may collaborate during image capture efforts in order to obtain desired stereoscopic images.

Described techniques thus provide high-quality stereoscopic images in a convenient and inexpensive manner. Other types of image effects may be provided, as well. For example, a traditional stereoscopic image provides for one or two viewing angles, corresponding to the two viewing angles used during image capture. Using described techniques, a stereoscopic image may be provided with more such viewing angles. For example, a user with a HMD and phone could move around the scene and/or move the phone around in space to get multiple views of the same scene. These images/views could then be combined by calculating the various inter-device distances used into a single image with a number of viewing angles for 3D effects.

Further, various types of volumetric capture may be performed. For example, two users may collaborate to walk around a scene to capture all angles with respect to the scene. In other examples, a wall-mounted camera could be used as one of the cameras. One of the devices used may be provided or equipped with a depth generator, and the captured depth data may be used with the captured images, including the inter-device distance determined with respect to each corresponding image, so that a volumetric capture may be produced.

Thus, described techniques provide for the capture of many types of spatial images and/or video. Such capture may result in unique or unusual types of image data, including immersive image/video data suitable for use in Virtual Reality (VR), Augmented Reality (AR), or other types of Extended Reality (XR) applications and use cases, and/or may be captured using convenient, inexpensive techniques, including the use of wearable or holdable devices.

FIG. 1 illustrates an example implementation of a system for multi-device image capture for image effects. In the example of FIG. 1, a user 102 is illustrated as using a head mounted device (HMD) 104 and a smartphone 106. The HMD 104 and the smartphone 106 are separated by an inter-device distance 105, which, in the example, is dictated by a manner in which the user 102 holds the smartphone 106. For example, the user 102 may hold the smartphone at a greater or lesser distance from the HMD 104.

In other examples, the user 102 may hold or wear one of the devices 104, 106, while a second user holds or wears the other of the devices 104, 106. In such cases, the inter-device distance 105 may be dictated by relative movements of the two users. More generally, as referenced above and discussed below in more detail, the inter-device distance 105 represents any distance between two devices used for image capture techniques described herein.

Figure 7:
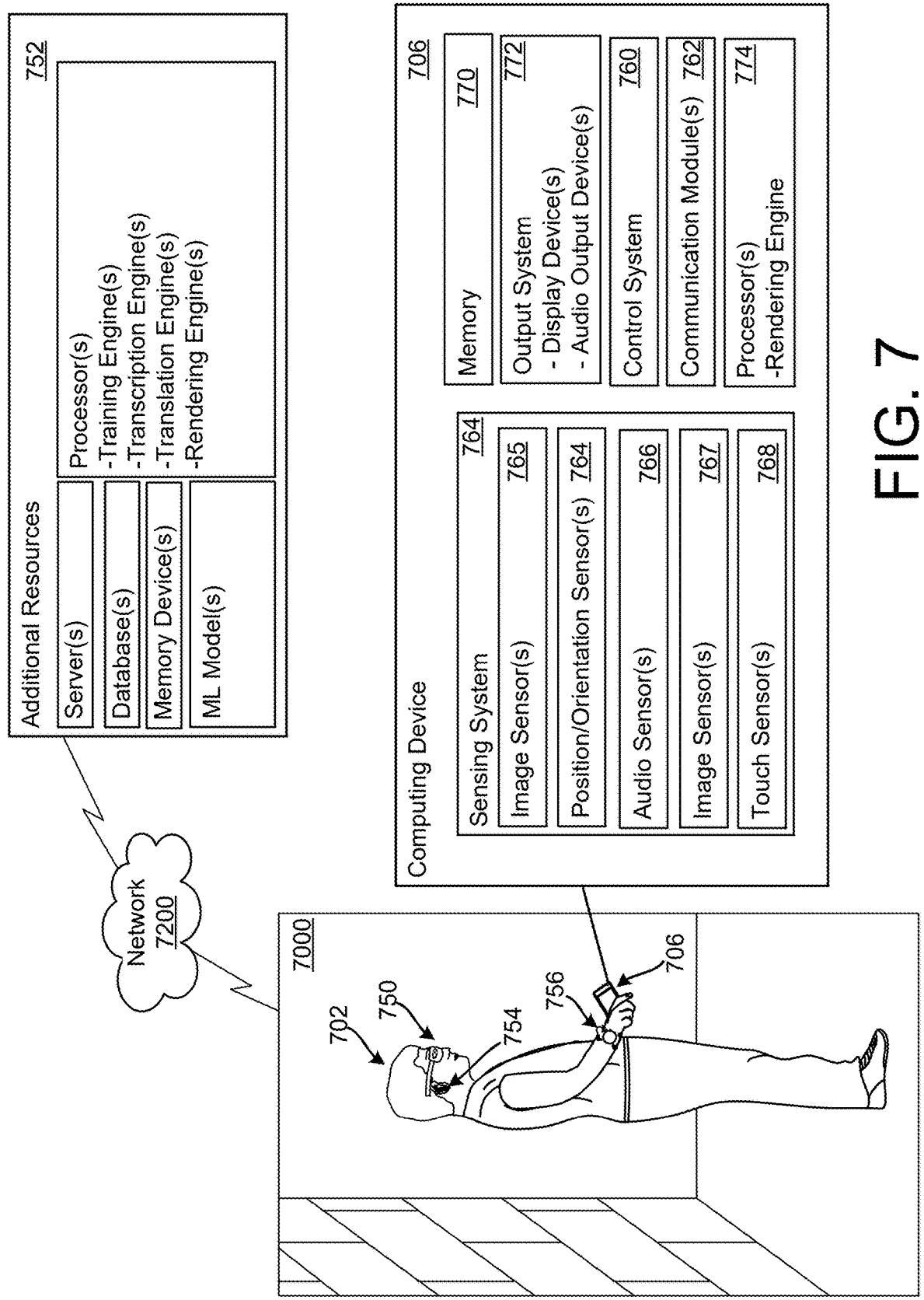
FIG. 7 is a third person view of a user in an ambient computing environment.

For example, although FIG. 1 illustrates the example of the HMD 104 and the smartphone 106, any type of device with a camera, including wearable devices, holdable devices, and/or mountable devices may be used. For example, FIG. 7 provides additional examples of wearable and/or holdable devices. In other examples, devices mounted to a wall, stand, or other structure may be used. Mounting may be fixed, or may provide for various changes in positioning (e.g., rotating or sliding). A camera may be mounted on, or included in, a movable device, such as a drone.

Further, although FIG. 1 illustrates an example with the two devices 104, 106, it will be appreciated that three or more devices may be used. For example, the HMD 104 may cause a third device to capture an image of the scene 108 from a third angle and at a second distance from the HMD 104 than the inter-device distance 105 between the HMD 104 and the smartphone 106.

In the example of FIG. 1, a scene 108 is represented by two example image subjects. Of course, the scene 108 of FIG. 1 is provided merely by way of example, and virtually any scene desired and available for image capture may be used.

In FIG. 1, the HMD 104 (e.g., a camera thereof) captures a first image of the scene 108, shown as HMD image 112. Similarly, the smartphone (e.g., a camera thereof) captures a second image of the scene 108, shown as smartphone image 110. For example, the HMD 104 may wireless invoke image capture by the smartphone 106, using an available wireless connection, so that the smartphone image 110 and the HMD 112 are captured synchronously, or very close to synchronously. As may be observed, the smartphone image 110 and the HMD image 112 are captured at different viewing angles, where relative differences in the viewing angles are dictated by the inter-device distance 105.

As a result, by calculating or otherwise determining the inter-device distance 105, software and/or hardware of the HMD 104 and/or the smartphone 106 may be used to generate a 3D image 114, which may also be referred to as a spatial image. For example, the 3D image may be generated as a stereoscopic image, but other types of spatial image and/or video may be captured, as well.

In the example, as referenced, the inter-device distance 105 is unknown and highly variable, and changes based on hand movements of the user 102. To determine the inter-device distance 105, as described in more detail below, the HMD 104 (or the smartphone 106) may process the images 110, 112 using an estimated inter-device distance 105. A resulting, initial spatial image may then be evaluated to determine a spatial image quality relative to a spatial image quality threshold.

Then, an updated (e.g., increased or reduced) inter-device distance 105 may be used to calculate an updated spatial image, the quality of which may then be calculated and evaluated against the spatial image quality threshold and/or against the preceding spatial image quality. Iterations may continue by increasing or decreasing the inter-device distance in a direction the corresponds to increasing spatial image quality of calculated spatial images, until the final spatial or 3D image 114 is obtained having a spatial image quality that satisfies the spatial image quality threshold.

Figure 2:
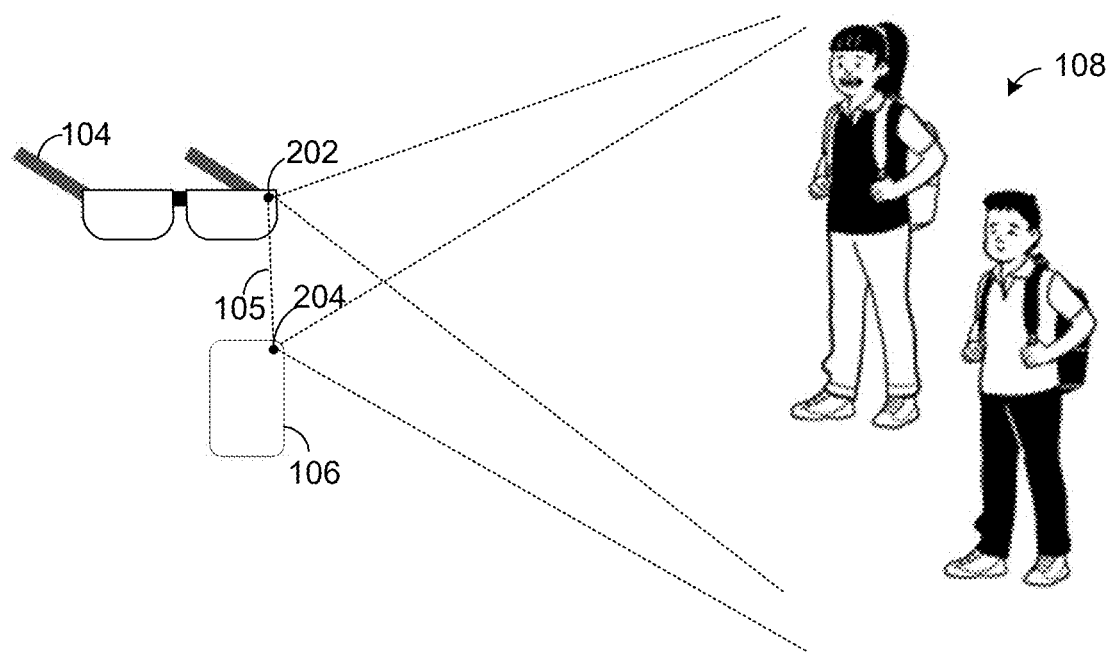
FIG. 2 is a more detailed example of the implementation of FIG. 1.

FIG. 2 illustrates the inter-device distance 105 more clearly as being defined between a first camera 202 of the HMD 104 and a second camera 204 of the smartphone 106. As shown, the cameras 202, 204 each have separate and distinct viewing angles of the scene 108, which partially overlap with one another. As is apparent from FIGS. 1 and 2, the inter-device distance 105 may be significantly larger than would be possible when using, e.g., two cameras mounted on a single one of the HMD 104 or the smartphone 106.

As a result, a strong parallax effect may be provided for a stereoscopic image or video, with reduced occlusion effects. Further, additional viewing angles may be captured simply by moving the smartphone 106 relative to the HMD 104 when capturing the scene 108 multiple times, so that multiple viewing angles may be provided for the resulting stereoscopic image.

Figure 3:
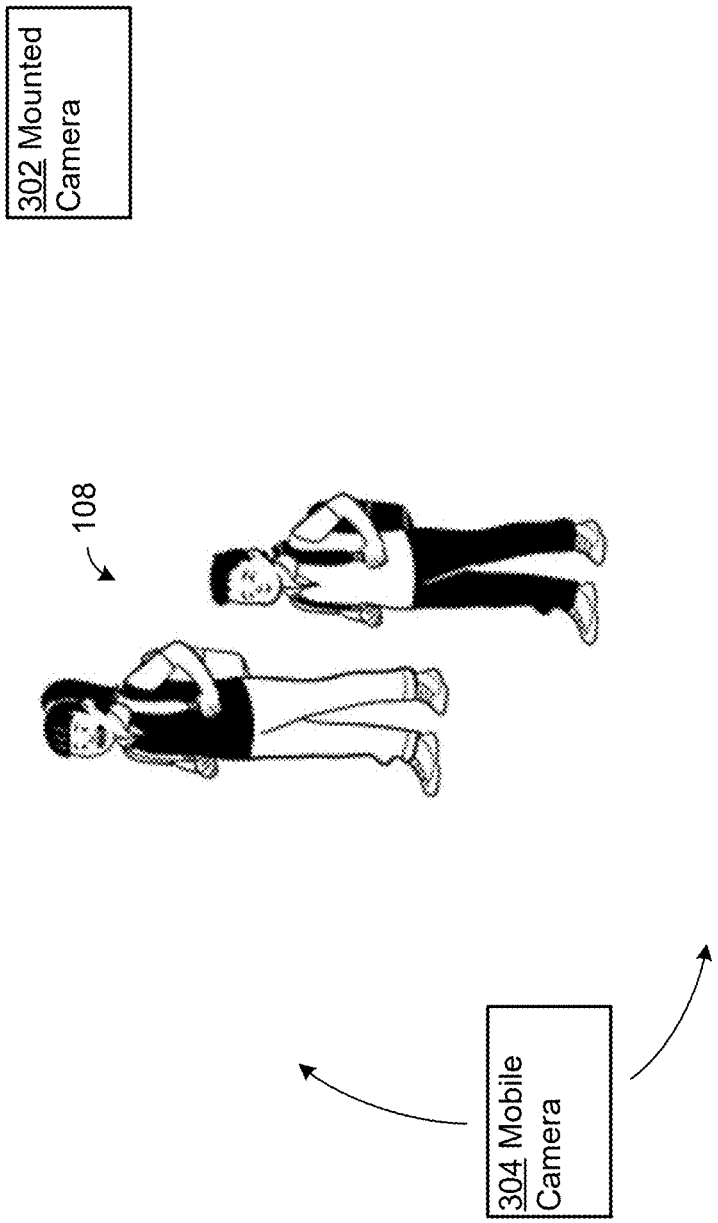
FIG. 3 is an alternate example of the implementation of FIG. 1.

FIG. 3 illustrates another alternative embodiment(s), in which a mounted camera 302 and a mobile camera 304 are used to capture a spatial image of the scene 108. Using described techniques, the mounted camera 302 and the mobile camera 304 may be used to capture, e.g., stereoscopic images with multiple viewing angles, or may be used to provide volumetric capture of the scene 108.

In example implementations, the mounted camera 302 may be mounted to a wall or other stationary object, or may be placed on a stand, or may otherwise have its position fixed. The mobile camera 304 may represent any of the wearable or holdable devices and associated cameras referenced herein, and, as such, may be mobile by virtue of movement of a user wearing/holding the mobile camera 304. In other examples, the mobile camera 304 may be mobile by virtue of being attached to any sort of mobile mechanism or device, including a drone or other remote-controlled vehicle.

Although FIG. 3 illustrates the mounted camera 302 and the mobile camera 304, it will be appreciated that other embodiments may utilize two or more mobile cameras, with or without the mounted camera 302. In other examples, two or more mounted cameras may be used, e.g., with one or more mobile cameras.

Accordingly, as referenced, many different viewing angles may be obtained with respect to the scene 108. Each pair of captured images may be associated with a corresponding inter-device distance, and one or more pairs of images may be combined to be rendered as various types of spatial images.

For example, in addition to the types of multiple viewing angle stereoscopic images referenced above, the example of FIG. 3 may be used to generate a volumetric capture of the scene 108. For example, as described in more detail with respect to FIG. 4, below, one or both of the mounted camera 302 and the mobile camera may be equipped with a depth sensor. Resulting depth sensor measurements may be obtained in conjunction with pairs of images (and associated, determined inter-device distances), all of which may be processed to provide a volumetric capture of the scene 108.

Thus, FIGS. 1-3 provide various non-limiting examples of use case scenarios of described techniques, which provide for spatial images that are convenient and inexpensive to obtain, and that provide unique and useful representations of captured scenes. For example, it is often desirable for providers of smartglasses to provide smartglasses that are inexpensive and that closely resemble conventional glasses, so as to be worn and used discretely. In such scenarios, even if it is technologically feasible to include multiple cameras on a single pair of smart glasses (e.g., at each temple) to capture stereoscopic images, resulting smart glasses may be undesirable from a cost and/or appearance standpoint, and, in any case, are incapable of providing the type of large and variable parallax effects described herein.

In other examples, existing volumetric capture techniques often require placement of many different cameras, positioned at known coordinates within a defined coordinate system, whereas described techniques may generate a volumetric capture or other 3D/spatial image using only two cameras. Resulting spatial images may be used in any suitable use case scenario(s), including construction of a 3D environment for use in a VR or other XR setting.

Figure 4:
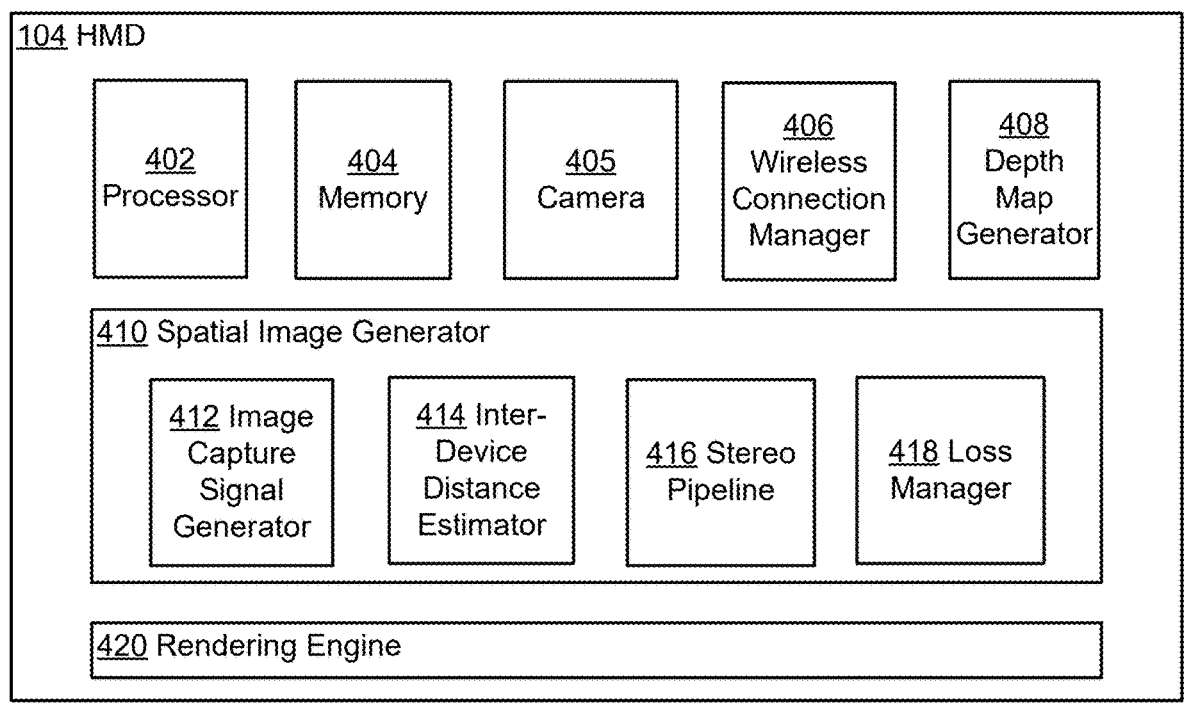
FIG. 4 is a block diagram of an example system for implementing the system of FIGS. 1-3.

FIG. 4 is a block diagram of an example system for implementing the system of FIGS. 1-3. Specifically, in the example, the HMD 104 of FIGS. 1 and 2 is illustrated as including a number of hardware and/or software components that implement various functionalities described above, and that are described in more detail, below. Although the HMD 104 is illustrated as smartglasses in the examples of FIGS. 1 and 2, it will be appreciated that the HMD 104 may represent any type of HMD, including, e.g., a headband, hat, or smart goggles. More generally, described aspects of FIG. 4 may be implemented using any suitable computing device, such as a mobile phone, laptop computing device, smart device, and/or so forth. The example of FIG. 4 shows the various illustrated components as being implemented in a single device, but, since two or more devices may be used together as described herein to produce spatial images, it will be appreciated that two or more devices may implement described components and functions in collaboration with one another.

In FIG. 4, the HMD 104 is illustrated as including a processor 402 and a memory 404, which may represent one or more processors and one or more memories, respectively. For example, the memory 404 may represent a non-transitory computer readable medium of any suitable sort, which may be used to store instructions that, when executed by the processor 402, result in the use or execution of one or more remaining components of FIG. 4, such as a camera 405, a wireless connection manager 406, a depth map generator 408, a spatial image generator 410, or a rendering engine 420.

The wireless connection manager 406 may be configured to provide a wireless connection between the HMD 104 and any other device(s) used to generate spatial images as described herein. Any suitable wireless connection may be used, including, e.g., a WiFi connection, a Bluetooth connection, or an ultrawideband (UWB) transmitter/receiver.

The depth map generator 408 represents any suitable hardware/software for gathering depth information with respect to a captured scene. For example, the depth map generator 408 may utilize depth data from one or more passive or active depth sensor(s), not separately illustrated in FIG. 4, which may include, e.g., a time-of-flight (ToF) camera, LiDAR sensor, RGB camera, or GPS sensor. Using received, raw depth data, the depth map generator 408 may be configured to generate a depth map that captures information characterizing relative depths of detected objects with respect to a defined perspective or reference point and within a captured scene.

The depth map generator 408 should be understood to represent and illustrate depth map software stored using the memory 404 and executed using the processor 402, and configured to process depth-related data captured by one or more depth sensors. The depth map generator 408 may thus be capable of determining a per-pixel depth of each pixel (and associated object or aspect) within a rendering space. For example, such depth information may be captured and stored as a perspective image containing a depth value instead of a color value in each pixel. A depth map may be generated and stored, e.g., as a 2D array, or as a depth mesh (e.g., a real-time triangulated mesh). Although the depth map generator 408 is illustrated in the singular in the HMD 104, multiple devices may coordinate to generate depth information (e.g., a depth map), as well.

The spatial image generator 410 (together with the rendering engine 420, may be configured to leverage the processor 402, the memory 404, the camera 405, the wireless connection manager 406, and/or the depth map generator 408 to provide the various functionalities (and related functionalities) described above with respect to FIGS. 1-3. For example, the spatial image generator 410 may include an image capture signal generator 412, which, at a time of image(s) capture, may be configured to use the wireless connection manager 406 to invoke image capture at a second device (e.g., the smartphone 106 of FIG. 1).

For example, before or during activation of the spatial image generator 410, such as by opening an associated application, a wireless connection may be established with a second device(s) using the wireless connection manager 406. When a user initiates image capture using the camera 405, the image capture signal generator 412 may also transmit an image capture signal to the second device to cause a camera of the second device to simultaneously (e.g., within a time frame determined by a speed of the wireless connection, such as on the order of milliseconds) execute image capture using the second camera of the second device. Once at least a pair of images is captured, the wireless connection manager 406 may receive the second image from the second camera, via the available wireless connection(s).

An inter-device distance estimator 414 may be configured to determine an initial distance between the two devices being used. For example, such an estimate may be determined using one or more of multiple available techniques. For example, an available wireless connection, such as Bluetooth or UWB connection(s), may be used together or separately to determine an initial distance estimate.

In other examples, the inter-device distance estimator 414 may utilize external or received information to assist in generating the relevant distance(s). For example, the spatial image generator 410 may be executed in a defined mode, with associated expectations regarding the distance to be estimated. For example, the example of FIG. 1 may be implemented in a mode in which it is expected that the single user 102 is wearing/holding both the HMD 104 and the smartphone 106. In such cases, corresponding assumptions may be made about a minimum, expected, and/or maximum distance(s), based on relevant aspects of human physiology (e.g., arm length and/or arm movements). Such assumptions may be further improved by using individual characteristics of the user in question (e.g., a user profile). Similar expectations or assumptions may be defined in the example of FIG. 3, based on known aspects of, e.g., a position of the mounted camera 302 and/or a size of the scene 108. In some cases, if available, depth information from the depth map generator 408 may be used to establish an initial distance estimate. If no assumptions or expectations are available or known for a given use case, a standard or default distance estimate may be used.

A stereo pipeline 416 represents any suitable stereo pipeline for processing two or more images to produce a 3D or spatial image, based on a distance between cameras used to capture the two or more images. In the example of FIG. 4, the stereo pipeline 416 is implemented at the HMD 104, but in other examples, as described in more detail below with respect to FIG. 7, off-device processing (e.g. remote or cloud processing) may be utilized to partially or completely implement the stereo pipeline 416.

In conventional scenarios, a distance used by the stereo pipeline 416 is known and fixed (e.g., between two cameras mounted on a single device at known positions on the device). In described implementations, the estimated inter-device distance is processed by the stereo pipeline with the captured images, and an initial stereoscopic image (or other 3D/spatial image) is generated.

Then, a loss manager 418 may analyze the initial stereoscopic image to determine an image quality thereof. Depending on an accuracy of the initial estimated inter-device distance, the image quality of the initial stereoscopic image may be poor or unacceptable. The loss manager 418 may thus instruct the inter-device distance estimator 414 to increment the initial, estimated inter-device distance to a larger or smaller value.

The stereo pipeline 416 may then re-process the captured images using the updated, second inter-device distance, to obtain a second stereoscopic image. The loss manager 418 will analyze the second stereoscopic image to determine whether its image quality is better or worse than the first stereoscopic image obtained.

If better, the loss manager 418 may instruct the inter-device distance estimator 414 to increment the second inter-device distance in the same direction used previously (e.g., if previously incremented to be longer, the estimated inter-device distance may be incremented to be longer again, or, if previously incremented to be shorter, the estimated inter-device distance may be incremented to be shorter again). If worse, the loss manager 418 may instruct the inter-device distance estimator 414 to increment the second inter-device distance in the opposite direction used previously (e.g., if previously incremented to be longer, the estimated inter-device distance may be incremented to be shorter than the original estimate, or, if previously incremented to be shorter, the estimated inter-device distance may be incremented to be longer than the previous estimate).

Such iterations may continue for a defined period. For example, iterations may continue until an image quality calculated by the loss manager 418 is higher than a defined image quality threshold. Additionally, or alternatively, iterations may continue a defined or maximum number of times.

The above example(s) describe generation of a single spatial image from two or more images captured at a single time. As described with respect to FIGS. 1-3, a plurality of image captures may be performed over time to capture a succession or series of stereoscopic images, which may be used, e.g., to provide multi-viewing angle stereoscopic images, 3D video, or volumetric captures. For example, in FIG. 1, the user 102 may move the smartphone 106 to a new position for a second image capture event.

In such scenarios, the operations described above may largely be repeated to obtain a second 3D/spatial image. For example, the second image capture event may be initiated by the image capture signal generator 412, and the inter-device distance estimator 414 may generate a new initial inter-device distance estimate. In such scenarios, the new initial inter-device distance estimate may be informed by a final inter-device distance used by the stereo pipeline 416 to generate the final 3D/spatial image of the preceding image capture event. Similarly, operations of the loss manager 418 may be influenced by preceding image generation operations and/or by assumptions regarding the series of image capture events.

For example, the second initial inter-device distance estimate may simply use the final distance of the preceding image capture event. Additionally, or alternatively, additional assumptions may be used to inform either the estimation of the second initial inter-device distance estimate and/or loss calculations (and subsequent updates) with respect to incrementing the inter-device distance by the loss manager 418. For example, in the example of FIG. 1, the single user 102 may move the smartphone 106, as referenced above.

Known movement models characterizing likely or feasible movements of a person in such scenarios may be leveraged to better estimate and increment the inter-device distance of the second image capture event. For example, known maximum (or likely maximum) arm movements (in terms of velocity and/or distance) may be utilized. If a volumetric capture is being performed, then a user may be instructed to take a defined number of steps between each image capture, so that assumptions regarding step size may be used to estimate and increment the inter-device distance(s) used.

A rendering engine 420 may be configured to render the resulting spatial image(s), e.g., using a display of the HMD 104 or other device (not shown in FIG. 4). In some cases, the rendering engine 420 may simply render a stereoscopic image of a final iteration of the spatial image generator 410. In other examples, the rendering engine may be used to provide smoothing effects between multiple frames.

In the example of FIG. 4, the spatial image generator 410 is illustrated as a separate component, but may be integrated with other components. In some implementations, for example, the depth map generator 408 and/or the rendering engine 420, or subcomponents thereof, may be included in the spatial image generator 410.

Figure 5:
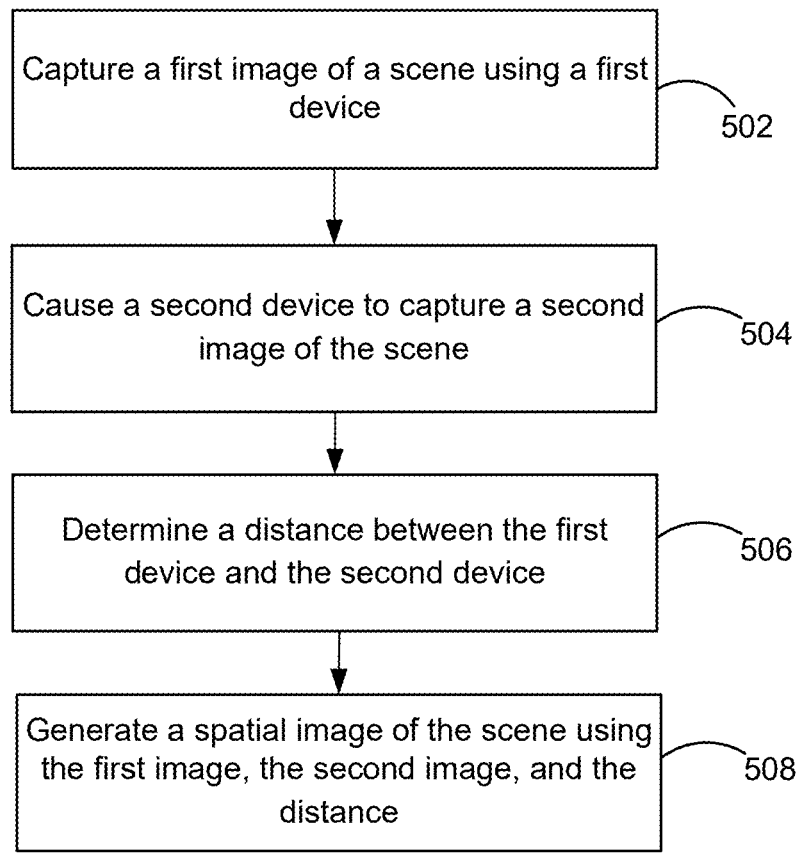
FIG. 5 is a flowchart illustrating example operations of the system of FIGS. 1-4.

FIG. 5 is a flowchart illustrating example operations of the systems of FIGS. 1-4. In the example of FIG. 5, operations are illustrated as separate, sequential operations. However, in various example implementations, the operations may be implemented in a different order than illustrated, in an overlapping or parallel manner, and/or in a nested, iterative, looped, or branched fashion. Further, various operations or sub-operations may be included, omitted, or substituted.

In FIG. 5, a first image of a scene may be captured using a first device (502). For example, in FIG. 4, the spatial image generator 410 of the HMD 104 may be activated and may use the camera 405 to capture a first image of the scene 108, e.g., the HMD image 112 of FIG. 1.

A second device may be caused to capture a second image of the scene (504). For example, the image capture signal generator 412 may invoke image capture by a camera of the smartphone 106 of FIG. 1, to capture the smartphone image 110. The devices may use a wireless connection, e.g., may share a Bluetooth connection.

More generally, as described above with respect to FIGS. 1-3, any two devices/cameras may be used. As described above and in more detail with respect to FIG. 7, below, cameras may be fixed/mounted or may be mobile/moving, and may capture images of the scene from multiple angles or positions. Additionally, three or more cameras may be used, as well. For example, a first device may cause a second and third device to capture simultaneous images of the scene using corresponding wireless connections.

A distance between the first device and the second device may be determined (506). For example, the distance may be estimated initially to obtain an initial spatial image, and then the quality of that initial spatial image may be evaluated to obtain an updated distance estimate. This process may continue iteratively until a sufficiently accurate distance, as judged by the corresponding spatial image quality, is determined.

A spatial image of the scene may then be generated, using the first image, the second image, and the distance (508). For example, the spatial image may be generated as a stereoscopic image, stereoscopic video, 360 degree photograph, volumetric capture, or any suitable spatial image.

Figure 6:
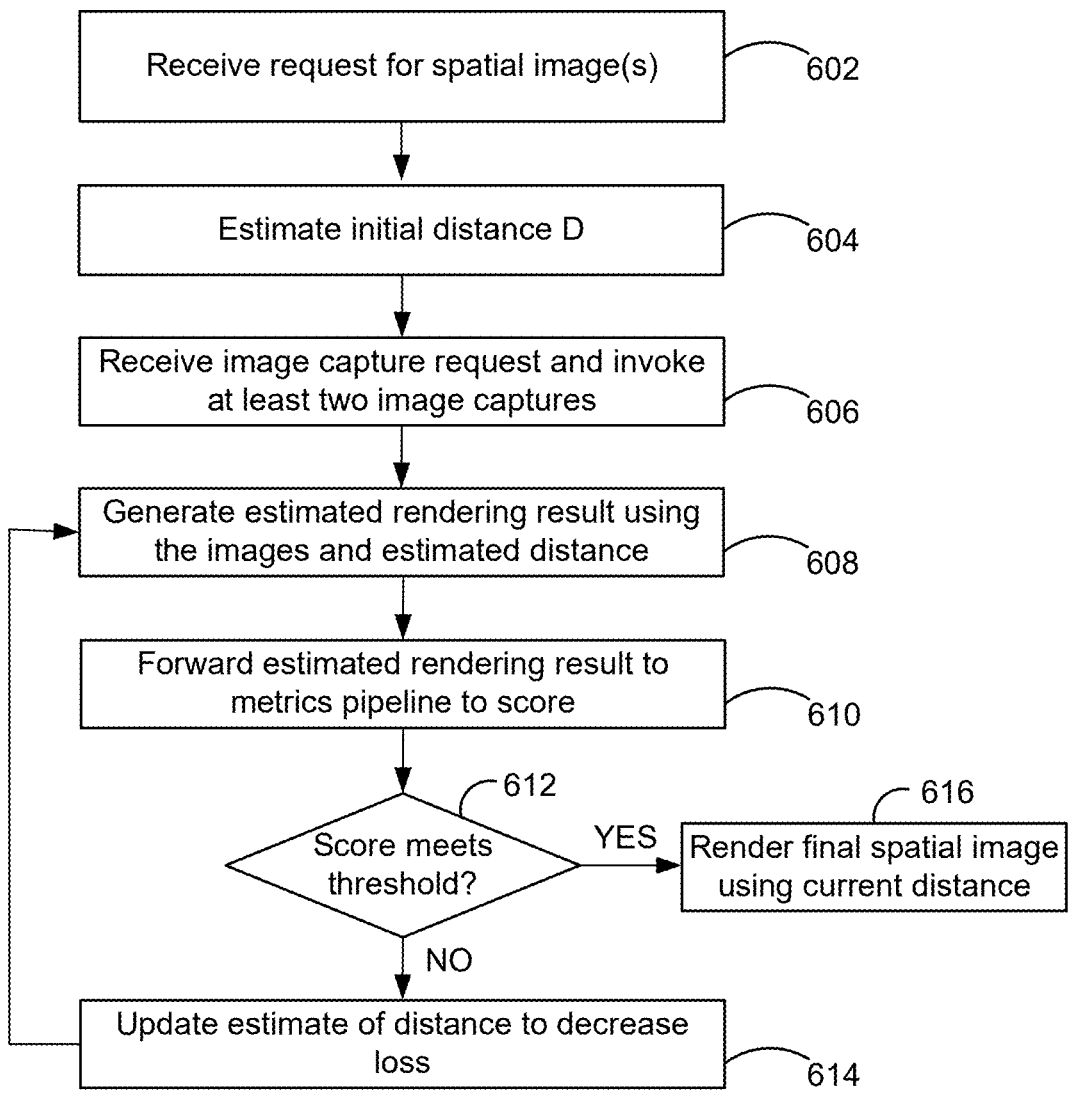
FIG. 6 is a flowchart illustrating more detailed example operations of the system of FIGS. 1-4.

FIG. 6 is a flowchart illustrating more detailed example operations of the system of FIGS. 1-4. In FIG. 6, a request for spatial image(s) is received (602). For example, a user of a first device may designate one or more paired devices for use in generating a spatial image. Various properties of each device may be specified, such as whether the device is mobile or fixed/mounted. In some cases, camera properties (e.g., lens properties) of one or more of the devices may be shared, in order to increase a consistency of image capture results among the different devices.

An initial distance estimate may be determined (604). For example, a wireless connection such as a Bluetooth or UWB connection may be used. In other examples, known assumptions about a current use case scenario may be leveraged. For example, when a user is wearing and/or holding multiple cameras, a human movement model may be used to set lower and upper bounds on possible inter-device distances, for a single frame and/or between multiple frames. In some examples, preview frames of one or more of the cameras being used may be used to perform initial distance estimates.

An image capture request may be received, and at least two image captures may be invoked (606). For example, a user may simply capture an image with one device (e.g., HMD), and that device may automatically invoke image capture at a second device (e.g., smartphone). From the user's point of view, this process is very similar to capturing an image using just the first device (HMD), while holding the second device, as no further action is required for the second image capture beyond holding/aiming the second device.

In other examples, as described, three or more cameras may be used. Using three or more cameras at associated image capture angles may provide greater accuracy of an obtained spatial image and improved image resolution. In some cases, depth information, e.g., a depth map, may be captured in conjunction with the images. For example, a single one of the devices may have depth generation capabilities, and/or the multiple devices may coordinate to generate depth information.

An estimated rendering result may be obtained, using the captured images and the estimated distance (608). For example, any conventional type of rendering associated with the desired type of spatial image (e.g., stereoscopic image, multi-viewing angle stereoscopic image, 360 degree image, or volumetric capture image) may be obtained.

The estimated rendering result may be forwarded to a metrics pipeline, e.g., a stereo pipeline, for scoring (610). For example, various metrics such as image consistency and image disparity may be used. Metrics used may vary, e.g., based on the type of spatial image being generated. A resulting quality score effectively defines a computed loss as a quality score for the computed, estimated spatial image.

Then, if the computed score fails to meet a defined threshold (612), the estimate of the inter-device distance may be updated in a direction chosen to decrease the calculated loss (614). For example, the estimate of the distance may be increased or decreased, and operations may continue with generating an updated estimated rendering result (608) to be scored using the metrics pipeline (610). As long as the score is improving through such iterations, then the estimated distance updated are assumed to be moving in a correct direction towards an actual distance being used (otherwise, the estimated distance may be estimated in the other direction, e.g., increasing instead of decreasing, or vice versa). Iterations may continue until the computed score of a final iteration meets the threshold (612), or until a maximum number of iterations is reached. At this point, a final spatial image may be generated, using the current computed distance (616).

FIG. 6 generally describes image capture for a single spatial image. As described, multiple spatial images, e.g., sequences of spatial images, may also be captured to provide spatial video, e.g., stereoscopic video. In such cases, various techniques may be implemented to ensure spatio-temporal smoothness between frames. For example, as referenced above, a human movement model may be implemented to define constraints (e.g., maximum changes in inter-device distances) between consecutive frames/images captured. Additionally, or alternatively, a total variation between frames/images may be used to maintain image quality and enforce smoothness.

Although the above approaches have generally described the use of pairwise heuristics for pairs of images to determine spatial images, other techniques may be used, as well. For example, a neural network or other model may be trained to receive images and output a corresponding spatial image (or video). Such a model, or any of the above-described processing, may be performed locally and/or remotely. For example, desired spatial outputs that require more processing time (e.g., spatial video) may be processed remotely, as may be understood in more detail from the example of FIG. 7.

FIG. 7 is a third person view of a user 702 (analogous to the user 102 of FIG. 1) in an ambient environment 7000, with one or more external computing systems shown as additional resources 752 that are accessible to the user 702 via a network 7200. FIG. 7 illustrates numerous different wearable devices that are operable by the user 702 on one or more body parts of the user 702, including a first wearable device 750 in the form of glasses worn on the head of the user, a second wearable device 754 in the form of ear buds worn in one or both ears of the user 702, a third wearable device 756 in the form of a watch worn on the wrist of the user, and a computing device 706 held by the user 702. In FIG. 7, the computing device 706 is illustrated as a handheld computing device but may also be understood to represent any personal computing device, such as a table or personal computer.

In some examples, the first wearable device 750 is in the form of a pair of smart glasses including, for example, a display, one or more images sensors that can capture images of the ambient environment, audio input/output devices, user input capability, computing/processing capability and the like. Additional examples of the first wearable device 750 are provided below, with respect to FIGS. 8A and 8B.

In some examples, the second wearable device 754 is in the form of an car worn computing device such as headphones, or earbuds, that can include audio input/output capability, an image sensor that can capture images of the ambient environment 7000, computing/processing capability, user input capability and the like. In some examples, the third wearable device 756 is in the form of a smart watch or smart band that includes, for example, a display, an image sensor that can capture images of the ambient environment, audio input/output capability, computing/processing capability, user input capability and the like. In some examples, the handheld computing device 706 can include a display, one or more image sensors that can capture images of the ambient environment, audio input/output capability, computing/processing capability, user input capability, and the like, such as in a smartphone. In some examples, the example wearable devices 750, 754, 756 and the example handheld computing device 706 can communicate with each other and/or with external computing system(s) 752 to exchange information, to receive and transmit input and/or output, and the like. The principles to be described herein may be applied to other types of wearable devices not specifically shown in FIG. 7 or described herein.

The user 702 may choose to use any one or more of the devices 706, 750, 754, or 756, perhaps in conjunction with the external resources 752, to implement any of the implementations described above with respect to FIGS. 1-6. For example, the user 702 may use an application executing on the device 706 and/or the smartglasses 750 to execute the spatial image generator 410 of FIG. 4.

The device 706 may access the additional resources 752 to facilitate the aspects of the various techniques described herein, or related techniques. In some examples, the additional resources 752 may be partially or completely available locally on the device 706. In some examples, some of the additional resources 752 may be available locally on the device 706, and some of the additional resources 752 may be available to the device 706 via the network 7200. As shown, the additional resources 752 may include, for example, server computer systems, processors, databases, memory storage, and the like. In some examples, the processor(s) may include training engine(s), transcription engine(s), translation engine(s), rendering engine(s), and other such processors.

The device 706 may operate under the control of a control system 760. The device 706 can communicate with one or more external devices, either directly (via wired and/or wireless communication), or via the network 7200. In some examples, the one or more external devices may include various ones of the illustrated wearable computing devices 750, 754, 756, another mobile computing device similar to the device 706, and the like. In some implementations, the device 706 includes a communication module 762 to facilitate external communication. In some implementations, the device 706 includes a sensing system 764 including various sensing system components. The sensing system components may include, for example, one or more image sensors 765, one or more position/orientation sensor(s) 764 (including for example, an inertial measurement unit, an accelerometer, a gyroscope, a magnetometer and other such sensors), one or more audio sensors 766 that can detect audio input, one or more image sensors 767 that can detect visual input, one or more touch input sensors 768 that can detect touch inputs, and other such sensors. The device 706 can include more, or fewer, sensing devices and/or combinations of sensing devices. Various ones of the various sensors may be used individually or together to perform the types of saliency detection described herein.

Captured still and/or moving images may be displayed by a display device of an output system 772, and/or transmitted externally via a communication module 762 and the network 7200, and/or stored in a memory 770 of the device 706. The device 706 may include one or more processor(s) 774. The processors 774 may include various modules or engines configured to perform various functions. In some examples, the processor(s) 774 may include, e.g, training engine(s), transcription engine(s), translation engine(s), rendering engine(s), and other such processors. The processor(s) 774 may be formed in a substrate configured to execute one or more machine executable instructions or pieces of software, firmware, or a combination thereof. The processor(s) 774 can be semiconductor-based including semiconductor material that can perform digital logic. The memory 770 may include any type of storage device or non-transitory computer-readable storage medium that stores information in a format that can be read and/or executed by the processor(s) 774. The memory 770 may store applications and modules that, when executed by the processor(s) 774, perform certain operations. In some examples, the applications and modules may be stored in an external storage device and loaded into the memory 770.

Although not shown separately in FIG. 7, it will be appreciated that the various resources of the computing device 706 may be implemented in whole or in part within one or more of various wearable devices, including the illustrated smartglasses 750, earbuds 754, and smartwatch 756, which may be in communication with one another to provide the various features and functions described herein.

Figure 8A:
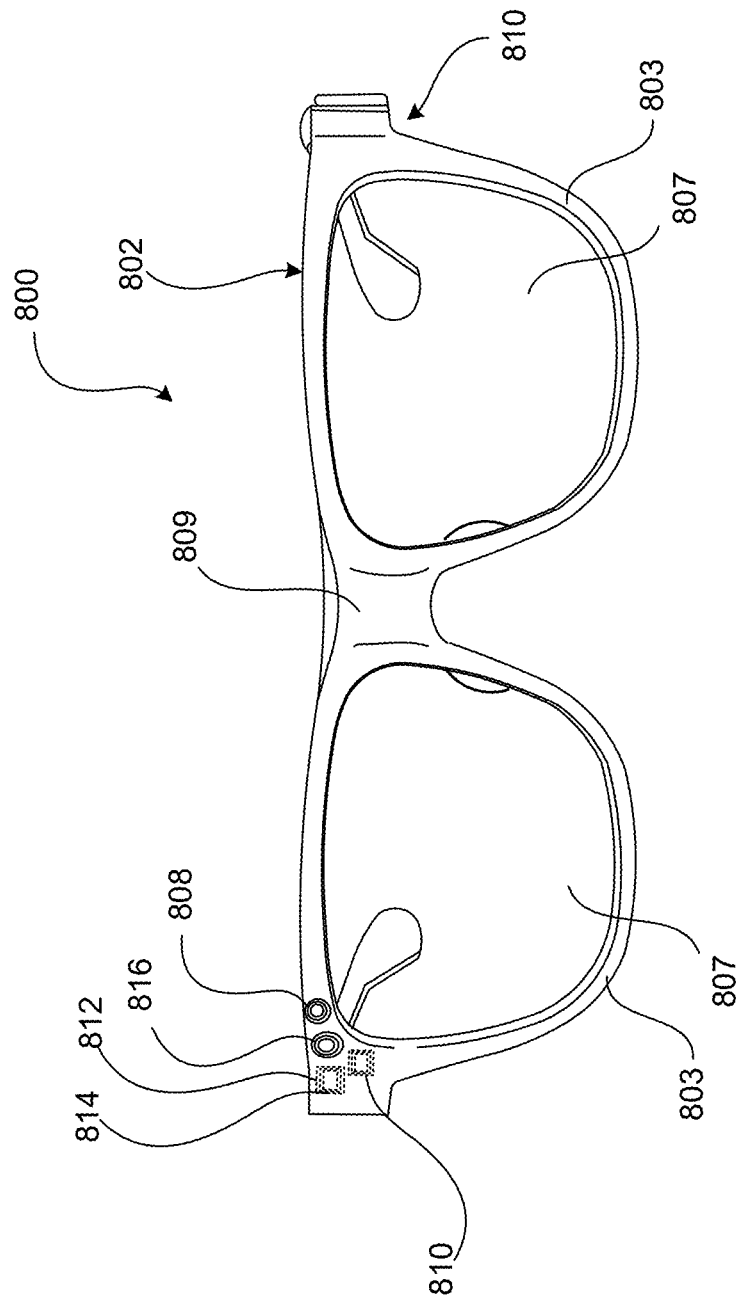
FIGS. 8A and 8B illustrate front and rear views of an example implementation of a pair of smartglasses.
Figure 8B:
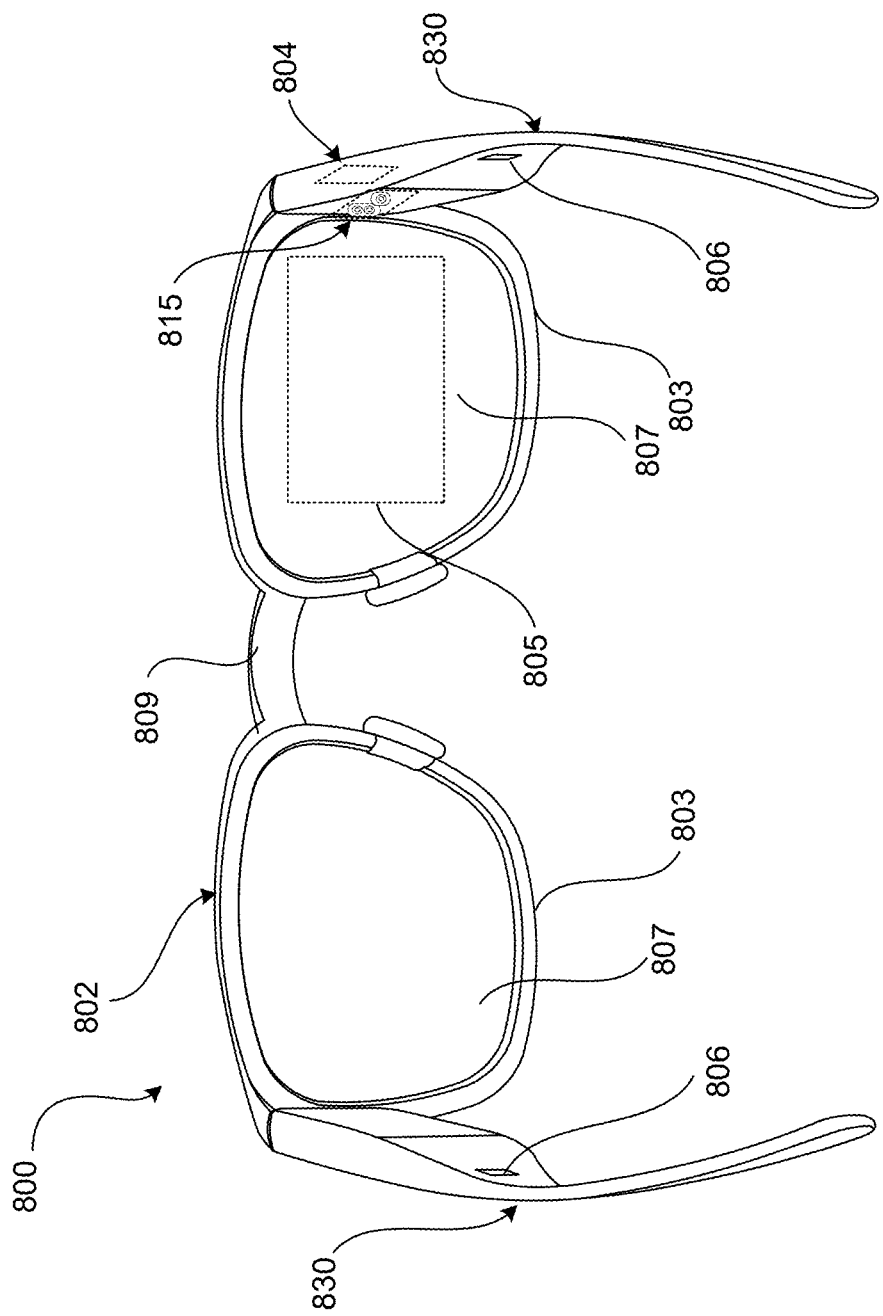

An example head mounted wearable device 800 in the form of a pair of smart glasses is shown in FIGS. 8A and 8B, for purposes of discussion and illustration. The example head mounted wearable device 800 includes a frame 802 having rim portions 803 surrounding glass portion, or lenses 807, and arm portions 830 coupled to a respective rim portion 803. In some examples, the lenses 807 may be corrective/prescription lenses. In some examples, the lenses 807 may be glass portions that do not necessarily incorporate corrective/prescription parameters. A bridge portion 809 may connect the rim portions 803 of the frame 802. In the example shown in FIGS. 8A and 8B, the wearable device 800 is in the form of a pair of smart glasses, or augmented reality glasses, simply for purposes of discussion and illustration.

In some examples, the wearable device 800 includes a display device 804 that can output visual content, for example, at an output coupler providing a visual display area 805, so that the visual content is visible to the user. In the example shown in FIGS. 8A and 8B, the display device 804 is provided in one of the two arm portions 830, simply for purposes of discussion and illustration. Display devices 804 may be provided in each of the two arm portions 830 to provide for binocular output of content. In some examples, the display device 804 may be a see through near eye display. In some examples, the display device 804 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 807, next to content (for example, digital images, user interface elements, virtual content, and the like) output by the display device 804. In some implementations, waveguide optics may be used to depict content on the display device 804.

The example wearable device 800, in the form of smart glasses as shown in FIGS. 8A and 8B, includes one or more of an audio output device 806 (such as, for example, one or more speakers), an illumination device 808, a sensing system 810, a control system 812, at least one processor 814, and an outward facing image sensor 816 (for example, a camera). In some examples, the sensing system 810 may include various sensing devices and the control system 812 may include various control system devices including, for example, the at least one processor 814 operably coupled to the components of the control system 812. In some examples, the control system 812 may include a communication module providing for communication and exchange of information between the wearable device 800 and other external devices. In some examples, the head mounted wearable device 800 includes a gaze tracking device 815 to detect and track eye gaze direction and movement. Data captured by the gaze tracking device 815 may be processed to detect and track gaze direction and movement as a user input. In the example shown in FIGS. 8A and 8B, the gaze tracking device 815 is provided in one of two arm portions 830, simply for purposes of discussion and illustration. In the example arrangement shown in FIGS. 8A and 8B, the gaze tracking device 815 is provided in the same arm portion 830 as the display device 804, so that user eye gaze can be tracked not only with respect to objects in the physical environment, but also with respect to the content output for display by the display device 804. In some examples, gaze tracking devices 815 may be provided in each of the two arm portions 830 to provide for gaze tracking of each of the two eyes of the user. In some examples, display devices 804 may be provided in each of the two arm portions 830 to provide for binocular display of visual content.

The wearable device 800 is illustrated as glasses, such as smartglasses, augmented reality (AR) glasses, or virtual reality (VR) glasses. More generally, the wearable device 800 may represent any head-mounted device (HMD), including, e.g., goggles, helmet, or headband, or another device (e.g., smartphone) mounted to a user's head using an external frame for use as a HMD. Even more generally, the wearable device 800 and the computing device 706 may represent any wearable device(s), handheld computing device(s), or combinations thereof.

Use of the wearable device 800, and similar wearable or handheld devices such as those shown in FIG. 7, enables useful and convenient use case scenarios of implementations of FIGS. 1-6.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method comprising:
capturing a first image of a scene using a first device;
causing a second device to capture a second image of the scene;
determining a distance between the first device and the second device; and
generating a spatial image of the scene using the first image, the second image, and the distance.

2. The method of claim 1, further comprising:
determining an estimate of a stereoscopic rendering based on the first image, the second image, and an initial distance;
determining an evaluation of the estimate; and
determining the distance, based on the evaluation.

3. The method of claim 1, further comprising:
capturing additional images of the scene using the first device and the second device, following movement of the second device relative to the first device;
repeatedly calculating updated distances between the first device and the second device in conjunction with the movement and for each pair of images of the additional images; and
generating at least one additional spatial image of the scene, based on the additional images and on the updated distances.

4. The method of claim 1, further comprising:
causing the second device to capture the second image synchronously with the capture of the first image by the first device.

5. The method of claim 1, further comprising:
determining an initial estimate of the distance;
generating an initial spatial image using the initial estimate;
determining that a quality of the initial spatial image is below a threshold;
generating an updated estimate of the distance;
generating an updated spatial image; and
iteratively generating the updated estimate of the distance and the updated spatial image until the quality of the updated spatial image satisfies the threshold.

6. The method of claim 1, further comprising:
causing a third device to capture a third image of the scene;
determining a second distance between the first device and the third device; and
generating a spatial image of the scene using the first image, the second image, the third image, the distance, and the second distance.

7. The method of claim 1, wherein the spatial image includes a stereoscopic image.

8. The method of claim 1, wherein the spatial image includes a stereoscopic video.

9. The method of claim 1, wherein the spatial image includes a volumetric capture.

10. The method of claim 1, wherein the first device includes a head-mounted device.

11. A computer program product, the computer program product being tangibly embodied on a non-transitory computer-readable storage medium and comprising instructions that, when executed by at least one computing device, are configured to cause the at least one computing device to:

capture a first image of a scene using a first device;
cause a second device to capture a second image of the scene;
determine a distance between the first device and the second device; and
generate a spatial image of the scene using the first image, the second image, and the distance.

12. The computer program product of claim 11, wherein the instructions, when executed by the at least one computing device, are further configured to cause the at least one computing device to:
determine an estimate of a stereoscopic rendering based on the first image, the second image, and an initial distance;
determine an evaluation of the estimate; and
determine the distance, based on the evaluation.

13. The computer program product of claim 11, wherein the instructions, when executed by the at least one computing device, are further configured to cause the at least one computing device to:
capture additional images of the scene using the first device and the second device, following movement of the second device relative to the first device;
repeatedly calculate updated distances between the first device and the second device in conjunction with the movement and for each pair of images of the additional images; and
generate at least one additional spatial image of the scene, based on the additional images and on the updated distances.

14. The computer program product of claim 11, wherein the instructions, when executed by the at least one computing device, are further configured to cause the at least one computing device to:
cause the second device to capture the second image synchronously with the capture of the first image by the first device.

15. The computer program product of claim 11, wherein the instructions, when executed by the at least one computing device, are further configured to cause the at least one computing device to:
determine an initial estimate of the distance;
generate an initial spatial image using the initial estimate;
determine that a quality of the initial spatial image is below a threshold;
generate an updated estimate of the distance;
generate an updated spatial image; and
iteratively generate the updated estimate of the distance and the updated spatial image until the quality of the updated spatial image satisfies the threshold.

16. The computer program product of claim 11, wherein the instructions, when executed by the at least one computing device, are further configured to cause the at least one computing device to:
cause a third device to capture a third image of the scene;
determine a second distance between the first device and the third device; and
generate a spatial image of the scene using the first image, the second image, the third image, the distance, and the second distance.

17. A wearable device comprising:
at least one frame for positioning the wearable device on a body of a user;
at least one camera;
at least one display;
at least one processor; and
at least one memory, the at least one memory storing a set of instructions, which, when executed, cause the at least one processor to:
capture a first image of a scene using the at least one camera;
cause a second device to capture a second image of the scene;
determine a distance between the wearable device and the second device; and
generate a spatial image of the scene using the first image, the second image, and the distance.

18. The wearable device of claim 17, wherein the set of instructions, when executed by the at least one processor, are further configured to cause the wearable device to:
determine an estimate of a stereoscopic rendering based on the first image, the second image, and an initial distance;
determine an evaluation of the estimate; and
determine the distance, based on the evaluation.

19. The wearable device of claim 17, wherein the set of instructions, when executed by the at least one processor, are further configured to cause the wearable device to:
capture additional images of the scene using the at least one camera and the second device, following movement of the second device relative to the wearable device;
repeatedly calculate updated distances between the wearable device and the second device in conjunction with the movement and for each pair of images of the additional images; and
generate at least one additional spatial image of the scene, based on the additional images and on the updated distances.

20. The wearable device of claim 17, wherein the set of instructions, when executed by the at least one processor, are further configured to cause the wearable device to:
determine an initial estimate of the distance;
generate an initial spatial image using the initial estimate;
determine that a quality of the initial spatial image is below a threshold;
generate an updated estimate of the distance;
generate an updated spatial image; and
iteratively generate the updated estimate of the distance and the updated spatial image until the quality of the updated spatial image satisfies the threshold.

* * * * *